Figure 1:
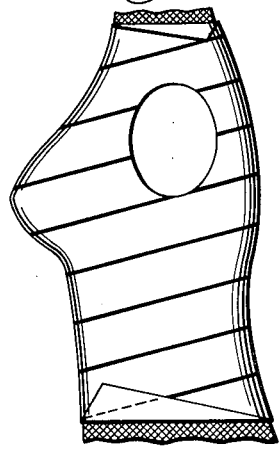

Sept. 14, 1943.  S. P. LOVELL  2,329,207

THERMOPLASTIC SHEET MATERIAL

Filed Nov. 13, 1939

Inventor:
Stanley P. Lovell.
by Kenway & Witter
Attorneys

Patented Sept. 14, 1943

2,329,207

UNITED STATES PATENT OFFICE 2,329,207

THERMOPLASTIC SHEET MATERIAL

Stanley P. Lovell, Newton Center, Mass., assignor to Beckwick Manufacturing Company, Dover, N. H., a corporation of New Hampshire Application November 13, 1939, Serial No. 304,209

4 Claims. (Cl. 117—161)

This invention consists in a novel thermoplastic sheet of strip material particularly useful in making hollow conformed shells, such for example as dress forms, tailor's dummies for window display, protectors for athletes, and similar articles. Attempts have been made heretofore to employ plaster of Paris, wet papier mâché, glued paper tape and other materials for these purposes, but none of these materials is entirely satisfactory in that they become distorted when exposed to humid conditions or they are fragile and easily damaged, or when made from living models, they impose a heavy burden on the person being fitted. For example, plaster of Paris is easily cracked or chipped; papier mâché and gummed tape are distorted by moisture, and the discomfort to a living model encased in these moisture-containing materials is extreme and even a serious danger to health.

The object of the present invention is to make available a process obviating the difficulties above discussed and providing a light, tough, resilient form accurately shaped to the model and, if desired, produced without discomfort from a living model.

I have discovered that these results may be achieved by employing in the construction of the form a thermoplastic sheet material capable of being readily conformed to any desired shape when rendered plastic by means of moderate heat, and having the capacity of hardening and stiffening to retain the desired molded form upon being cooled to room temperature. This is an important characteristic of the sheet material of my invention, viz. that it is rendered plastic by the application of moderate heat (and by that I mean when heated to a degree not uncomfortable to human touch), but does not again harden until its temperature has been reduced substantially below its original softening point and substantially to room temperature. For example, it may soften and become plastic at 130° F. and remain in that plastic condition until cooled down to 90° F.

The essential qualities of the material employed in carrying out my invention are that it should be available in sheet or strip form capable of being rendered limp or plastic by moderate heat, so that it may be molded closely to the body of a living model without discomfort, that it should then stiffen in its molded form by cooling to room temperature, and finally that in its stiffened form it should be light, tough and resilient and not subject to distortion if moistened.

I have further discovered that a satisfactory material may be provided by blending in the proper poportions and plasticizing vegetable wax, rubber, beeswax, and a suitable resin and then spreading or distributing the material in sheet form with a fabric base or backing. My preferred formula includes

| | Parts |
|---|---|
| Candelilla wax | 30 |
| Rubber | 10 |
| Beeswax | 10 |
| Resin or rosin | 50 |

Candelilla wax is a well-known natural vegetable wax and is obtainable in various commercial forms with melting points of 150° F. to 180° F. The resin employed may be one of a class consisting of thermoplastic resins compatible with rubber and with the wax employed, and having a moderate melting point, among which I enumerate polysteren, polyvinylacetate,, butyl methacrylate, and for purposes of economy these or any one of them may be blended with rosin. It is characteristic of the material of this formula that it becomes soft or thermoplastic within a narrow range of critical temperature while it stiffens slowly over a considerable range of temperature. For example, it may soften at some point between 130° to 180° F. and may harden in cooling from 125° to 90° F.

In making up the foregoing formula the preferred procedure is to mill the rubber upon heated rolls with the candelilla wax, adding to the mass in the mill, if desired, any suitable pigmentation, such as zinc or titanium oxides, iron oxide, or the like. The beeswax is meanwhile reduced to molten condition and the resin or resin-rosin compound added thereto. The rubber-candelilla mixture is then dissolved in the molten beeswax-resin solution at the molten temperature, that is to say, in the neighborhood of 320° F. and the whole mixture strirred until it becomes apparently a homogeneous blend.

For my fibrous base I may employ a cotton woven cloth such as flanned or a felted cloth but I prefer to employ a knitted material. I have found desirable for this purpose tubular knit goods of a count of 34/36 K. P., weighing approximately eight yards to the pound. Such a knitted base has great strength from edge to edge but little stretch lengthwise of the goods. It may be immersed in the molten bath above described and thereupon acquires a load of the saturant and upon removal and cooling forms a solid flexible sheet of substantially uniform thickness. When cooled the resulting sheet is very tough as a whole although its coating is locally brittle so that the sheet crackles slightly upon being worked between the fingers. Its surface is fairly smooth although it may show traces of the enclosed textile structure. For example, if a knitted fabric base is used the surface of the composite sheet will have therein a detectable indication of the longitudinal ribs of the base.

The sheet above described is non-tacky at normal or ordinary room temperatures and thermoplastic in its response to heat. It may be softened and rendered temporarily limp and plastic by being moderately heated, as on a steam plate to a temperature of 130° to 180° F. In this condition it may be conformed accurately to the contour of the model and this operation is facilitated by the fact that the sheets remain plastic throughout an appreciable range of temperature before stiffening. When cooled to room temperature, however, it hardens and stiffens in its conformed condition upon the model into an integral shell which is stiff, resilient and impervious to moisture. It will be noted also that the hardening or stiffening step of my improved process is affected by temperature change alone and that in this step no solvent vapor which may be inflammable or possibly toxic to a living model is evolved from the plastic material.

If it is desired to produce a dress form, the skin of the model may be protected by an insulating vest or chemise and for that purpose wool or jersey has been found very satisfactory. The thermoplastic sheet may now be cut into patterns of suitable shape, warmed on a steam table or on a hot dry plate and applied to the body of the model. The pattern may be substantially that of a poncho, that is to say, a sheet with a head hole in it and two side portions which may be brought down front and back. Alternatively the warmed plastic sheet may be applied as a front and back segment or as a continuous strip applied in spiral formation. In any case complete and accurate conformation of the contour of the model is readily brought about, especially since the knitted base will stretch and contract in the areas in which this is necessary, and the plastic form will thus reproduce accurately the reverse curves of the waist and hips.

While it is not essential that the compound be self-cementing, it is desirable that it should be and the formula above disclosed results in a material which does weld or unite to itself when warmed. Accordingly, in applying the plastic sheet material to the model, the edges may be overlapped and will become securely united without further treatment. After the model has been completely encased, the shell thus produced will harden within five or ten minutes by cooling to room temperature. By "room temperature" I mean approximately 70° F. When this is accomplished the shell may be divided into sections by cutting with shears and removed from the model. These sections may be subsequently refastened along the lines of severance by any suitable means, such as a zipper fastener or adhesive tape. The resulting form which is a faithful replica of the model may now be mounted upon an upright stand and is ready for use.

Figure 2:
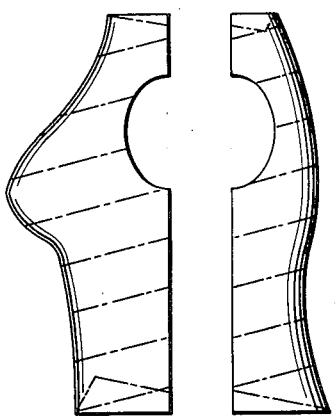
Figure 3:
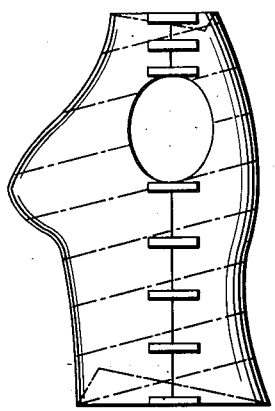
Figure 4:
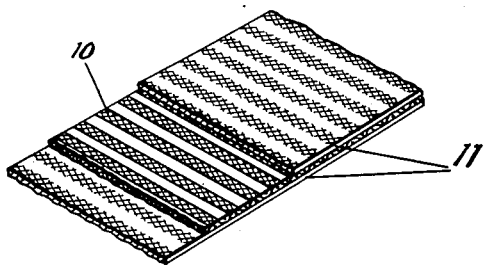

The accompanying drawing is illustrative of one manner in which the process of my invention may be put into practice and in these, Fig. 1 is a diagrammatic view in elevation showing a spiral strip applied to the torso of a living model, Fig. 2 shows the hardened shell split and removed, Fig. 3 is a view in elevation of the complete form, and Fig. 4 is a view in perspective with portions broken away illustrating the character of the plastic sheet material.

Referring first to Fig. 4, the knitted fabric backing 10 is shown as having thin layers of plastic composition 11 on both surfaces thereof. In Fig. 1 this material in strip form is represented as wound spirally about the model which has first been provided with a chemise, the strip being cut off on a curve to fit about the arms and being slightly overlapped in consecutive turns. In Fig. 2 the shell thus formed is represented as split on both sides and removed from the model. In Fig. 3 the sections of the form are represented as being joined by patches of adhesive tape or the like.

While I have described the invention in its application to the production of a dress form, it will be understood that it may be carried out in the production of any other desired form. For example, a helmet for football players may be made actually to fit the head of the wearer by using the head as a model and employing a wool felt as a base fabric. For such use a higher percentage of resin than that stated in the exemplary formula may be employed in order to give greater hardness and greater capacity to resist shock. While the term "hardness" is a relative one, when used to describe a conformed dress form or other article constructed of the material herein disclosed, I mean that the material of the form has a hardness of about 3.0 in the Mohs' hardness scale.

Having thus disclosed my invention and described specific examples of its application, I claim as new and desire to secure by Letters Patent, 1. Thermoplastic sheet material, normally non-tacky and comprising a knitted fabric base having distributed thereon a homogeneous composition of approximately 30 parts candelilla wax, 10 parts rubber, 10 parts beeswax and 50 parts thermoplastic resin compatible with rubber and candelilla wax, said sheet material having the characteristic of softening and becoming plastic when heated substantially above room temperature, and of remaining in plastic condition after being cooled below its softening point and until cooled substantially to room temperature.

2. Thermoplastic sheet material, normally non-tacky and comprising a textile base having distributed thereon a homogeneous composition of approximately 30 parts vegetable wax, 10 parts rubber, 10 parts beeswax, and 50 parts resin from the group consisting of polysterene, polyvinylacetate, and butyl methacrylate, said sheet material having the characteristic of softening and becoming plastic when heated above 130° F. and of remaining in plastic condition until cooled below 100° F.

3. Thermoplastic sheet material, normally non-tacky and comprising a textile base having distributed thereon a homogeneous composition of approximately 30 parts vegetable wax, 10 parts rubber, 10 parts beeswax, 50 parts rosin blended with a thermoplastic resin, said sheet material having the characteristics of softening and becoming plastic when heated substantially to above 70° F. and of remaining in plastic condition when cooled substantially below its softening point.

4. An improved thermoplastic sheet, non-tacky at normal temperature and comprising a base of knitted double-ply textile fabric in flattened tubular form having distributed thereon and therein a homogeneous composition of about thirty parts vegetable wax, about ten parts rubber, about ten parts beeswax and about fifty parts resin from the group consisting of polysterene, polyvinylacetate and butyl methacrylate, said sheet material having the characteristics of being locally brittle at room temperature, of softening and becoming plastic when heated substantially above room temperature and of remaining in plastic condition for an appreciable period when cooled substantially below its original softening point, and of hardening when so cooled.

STANLEY P. LOVELL.